July 16, 1963 P. DERIAZ 3,098,184
GEARING MECHANISM MOTOR DRIVE
Filed March 11, 1960 2 Sheets-Sheet 1

Inventor
Paul Deriaz
By Stevens, Davis, Miller & Mosher
Attorneys

July 16, 1963  P. DERIAZ  3,098,184
GEARING MECHANISM MOTOR DRIVE
Filed March 11, 1960  2 Sheets-Sheet 2

Inventor:
Paul Deriaz
By: Stevens, Davis, Miller & Mosher
Attorneys

United States Patent Office 3,098,184
Patented July 16, 1963

3,098,184
GEARING MECHANISM MOTOR DRIVE
Paul Deriaz, Rugby, England, assignor to The English Electric Company Limited, London, England, a British company
Filed Mar. 11, 1960, Ser. No. 14,393
Claims priority, application Great Britain Apr. 7, 1959
1 Claim. (Cl. 318—12)

The invention relates to the control gear of mixed radial-axial flow hydraulic pumps, turbines or reversible pump-turbines.

According to the present invention the member actuating the runner vanes through a slider block gear is operated by a reversible adjuster motor mounted on the free end of the pump- or turbine-shaft by means of an adjuster shaft arranged co-axially inside the said pump- or turbine-shaft through a self-arresting reduction gearing of high reduction ratio arranged inside the runner body. This reduction gearing is preferably of symmetrical design and then transmits a pure torque, free from side loads, to the said member actuating the runner vanes.

In order that the invention may be clearly understood and readily carried into effect, an embodiment thereof will be described with reference to the accompanying drawings, in which.

Figures 1, 2:
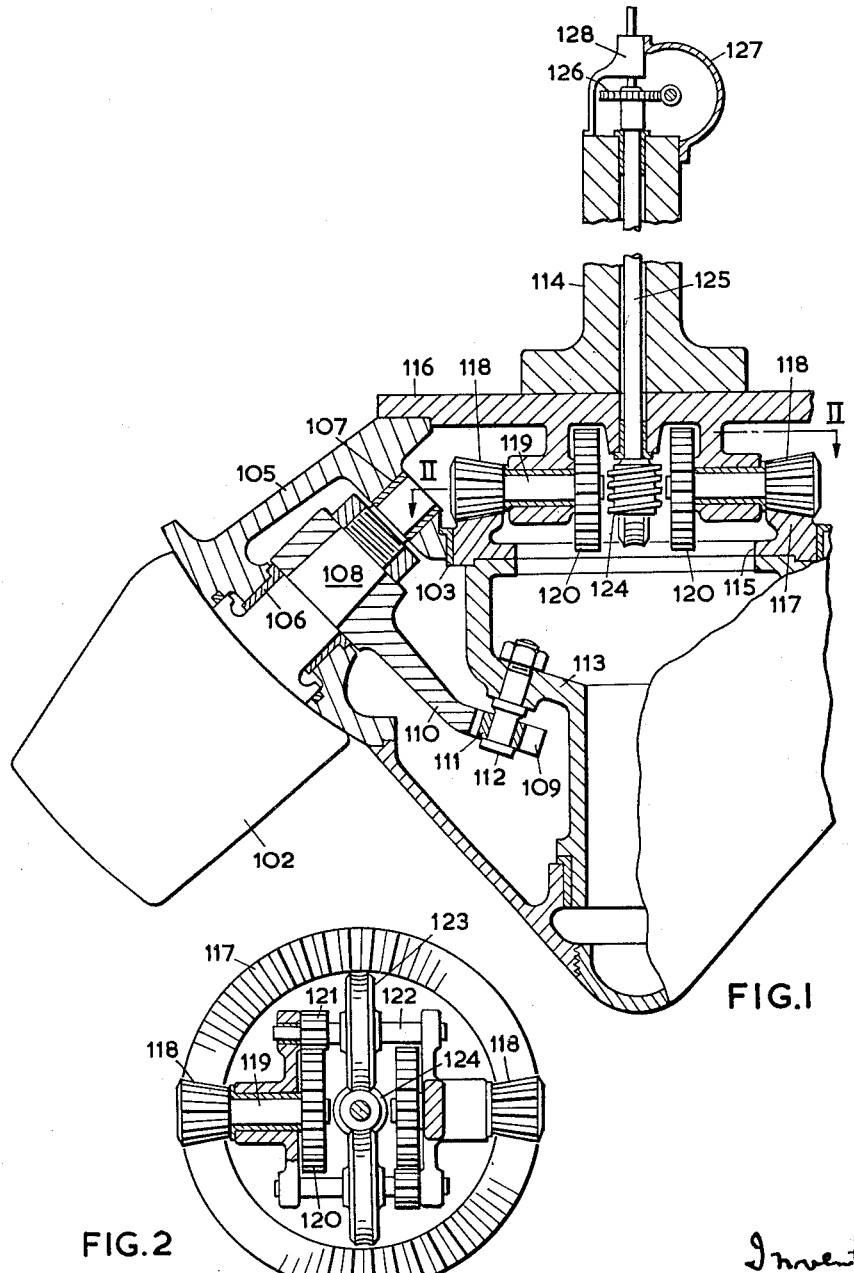
FIG. 1 is a longitudinal section.
FIG. 2 is a transverse part-section on the line II—II of FIG. 1 of the runner of a circulation pump according to the present invention.

Referring first to FIGS. 1 and 2 of the accompanying drawings, the runner vanes 102 are pivoted in the runner body 105 in bearings 106 and 107, and levers 110 keyed to their trunnions 108 have forked ends 109 each of which is engaged by a slider block 111 pivoted on a pin 112 mounted on a body 113 which is fixedly connected to a control ring 115, to which is fixed a bevel gear crown 117. This control ring 115 is journalled in the body 105 by means of a large plain bearing 103. Bevel pinions 118 mounted on lay shafts 119 journalled in the lid 116 of the runner body 105 mesh with the said crown 117. On the other ends of the lay shafts 119 spur gears 120 are fixed in mesh with spur gear pinions 121 which are in turn fixedly connected through lay shafts 122 journalled in the lid 116 of the runner body 105 to worm wheels 123 driven by a worm 124 on the inner end of a central shaft 125 arranged co-axially with the pump shaft 114 and in turn driven through a worm gearing 126 by a small reversible electric adjuster motor 127 arranged on the upper end of the shaft 114 i.e., above the synchronous motor (not shown) driving the pump.

Since the worm 124 drives a pair of worm wheels 123 which in turn, through the spur gearing 121, 120, drive a pair of bevel gear pinions 118 in mesh with the bevel gear crown 117, a pure couple without any side loads is applied to this gear crown 117. As the same is journalled in a large bearing 103 the inner circle of which must be sufficient to enclose the end-faces of the bevel gear pinions 118, the absence of any side loads is a marked advantage of this arrangement as regards friction and wear.

It will be realised that this drive of the runner vanes 102 is self-arresting in view of the worm gearings 123, 124 and 126, and that it accommodates a very high reduction ratio within the limited space of the runner body 105. Owing to the self-arresting character of the drive the adjuster motor 127 can simply be switched off after having effected the required adjustment of pitch of the runner vanes 102, without the risk of these vanes turning unintentionally. An indicator 128, which may be a revolution counter, fixed to the upper end of the central shaft 125 indicates the position of the vanes 102 and may automatically switch the motor 127 off by means of end switches (not shown) to prevent it from over-running the end position of the vanes 102. This device is also applicable to turbines or to reversible-pump turbines.

Figure 3:
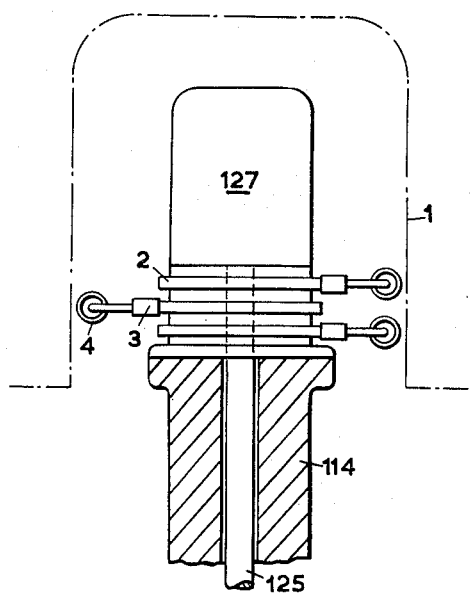
FIG. 3 is a diagrammatic elevation, partly in section, of the end of a main shaft with the slip rings and brushes arranged according to the invention.
Figure 4:
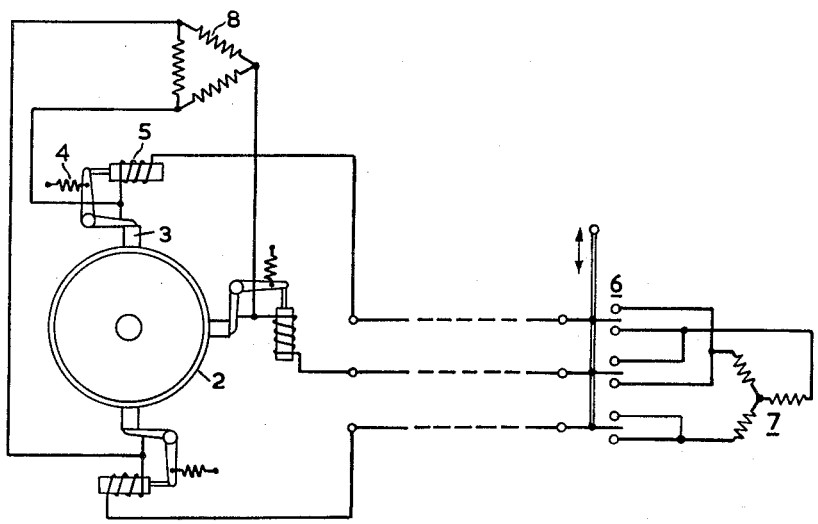
FIG. 4 is a diagrammatic plan view including a circuit diagram.

Referring now to FIGS. 3 and 4 of the accompanying drawings, on the free end of the main shaft 114 and small electric control motor 127 which is mounted here with a vertical shaft arm takes part as a whole in the rotation of the main shaft 114 and drives through the self-locking reduction gearing like 126 described hereinabove the control shaft 125 arranged co-axially inside the main shaft 114 and operating the adjustable runner vanes 102 of the pump or turbine described hereinabove. This electric motor 127 is covered by a stationary casing 1 on which brushes 3 are pivotally mounted which by means of springs 4 are normally biased away from the slip rings 2 of the electric motor 127.

These brushes 3 are connected in series each with a solenoid 5 which when energized overrides the bias of the spring 4 associated with the brush, and brings the brush into contact with its associated slip ring 2. These solenoids can be electrically connected by a reversing control switch 6 (shown in FIG. 2 in the off position) with an electric current source 7 in two opposite senses depending upon in which direction of the double arrow the switch 6 is actuated. The brushes 3 and solenoids 5 may be interconnected by resistances 8 as diagrammatically shown in FIG. 2.

In whatever direction the switch 6 is operated, the solenoids 5 are energized and the brushes 3 are thereby brought into contact with the slip rings 2, so that the electric control motor is supplied with current in the correct sense, depending on the position of the switch 6. Immediately the latter is moved to the off position, the solenoids 5 are de-energized and the brushes 3 lifted off the slip rings 2 by the bias of the springs 4, whereby unnecessary wear is prevented.

The arrangement according to FIGS. 3 and 4 has the advantage that the brushes 3 are normally kept off the said slip rings 2 and are automatically brought into contact with them immediately before a control operation of the said runner vanes 102, and lifted off again immediately after such control operation. Since control movements are applied to the runner vanes 102 only from time to time and for short periods during the prolonged intervals between such control movements unnecessary wear of the said slip rings and the brushes contacting the same is obviated by the present arrangement.

What I claim as my invention and desire to secure by Letters Patent is:

A gearing mechanism comprising in combination: a main shaft, a reversible electric adjuster motor having a casing mounted on one end of said main shaft so as to take part in the rotation thereof, an adjuster shaft arranged co-axially inside the said main shaft and rotatable independently of the latter, reduction gearing interposed between the said adjuster motor and the said adjuster shaft, self-arresting reduction gear mounted at the other end of said main shaft and in driving connection with said adjuster shaft as its input shaft, at least one output shaft of the said self-arresting gear journalled at the said other end of the said main shaft, slip rings mounted electrically insulated on the said casing of the electric adjuster motor and electrically connected to the said motor, a stationary casing surrounding said electric adjuster motor, brushes pivotally mounted in the said casing, springs connected to the said casing and to the said brushes and biasing the latter off the said slip rings, solenoids mounted in the said casing and having armatures connected to the said brushes in the sense of forcing the latter against the said slip rings when the said solenoids are energized, overcoming the bias of the said spring, electrical conductors connected to the said solenoids and to the said brushes, and an electric switch controlling the said conductors in the sense of simultaneously connecting and disconnecting, respectively, the said solenoids and brushes to and from an external current source.

References Cited in the file of this patent

UNITED STATES PATENTS

| | | |
|---|---|---|
| 790,875 | Abrey | May 30, 1905 |
| 1,764,709 | Anderson | June 17, 1930 |
| 1,901,773 | Pfau | Mar. 14, 1933 |
| 2,128,575 | Roberts | Aug. 30, 1938 |
| 2,132,504 | Whisler | Oct. 11, 1938 |
| 2,265,952 | Montgomery | Dec. 9, 1941 |
| 2,342,672 | Kinnucan | Feb. 29, 1944 |
| 2,640,552 | Chillson | June 2, 1953 |
| 2,648,586 | Behrens | Aug. 11, 1953 |
| 2,801,068 | Deriaz | July 30, 1957 |